May 12, 1953 R. A. HINKLEY 2,637,942
GLASSWORKING MACHINE
Filed Jan. 25, 1950 4 Sheets-Sheet 1

Inventor
RAY A. HINKLEY
By Rolf E. Schneider
Attorney

Inventor
RAY A. HINKLEY
By
Rolf E. Schneider
Attorney

May 12, 1953
R. A. HINKLEY
2,637,942
GLASSWORKING MACHINE
Filed Jan. 25, 1950
4 Sheets-Sheet 3
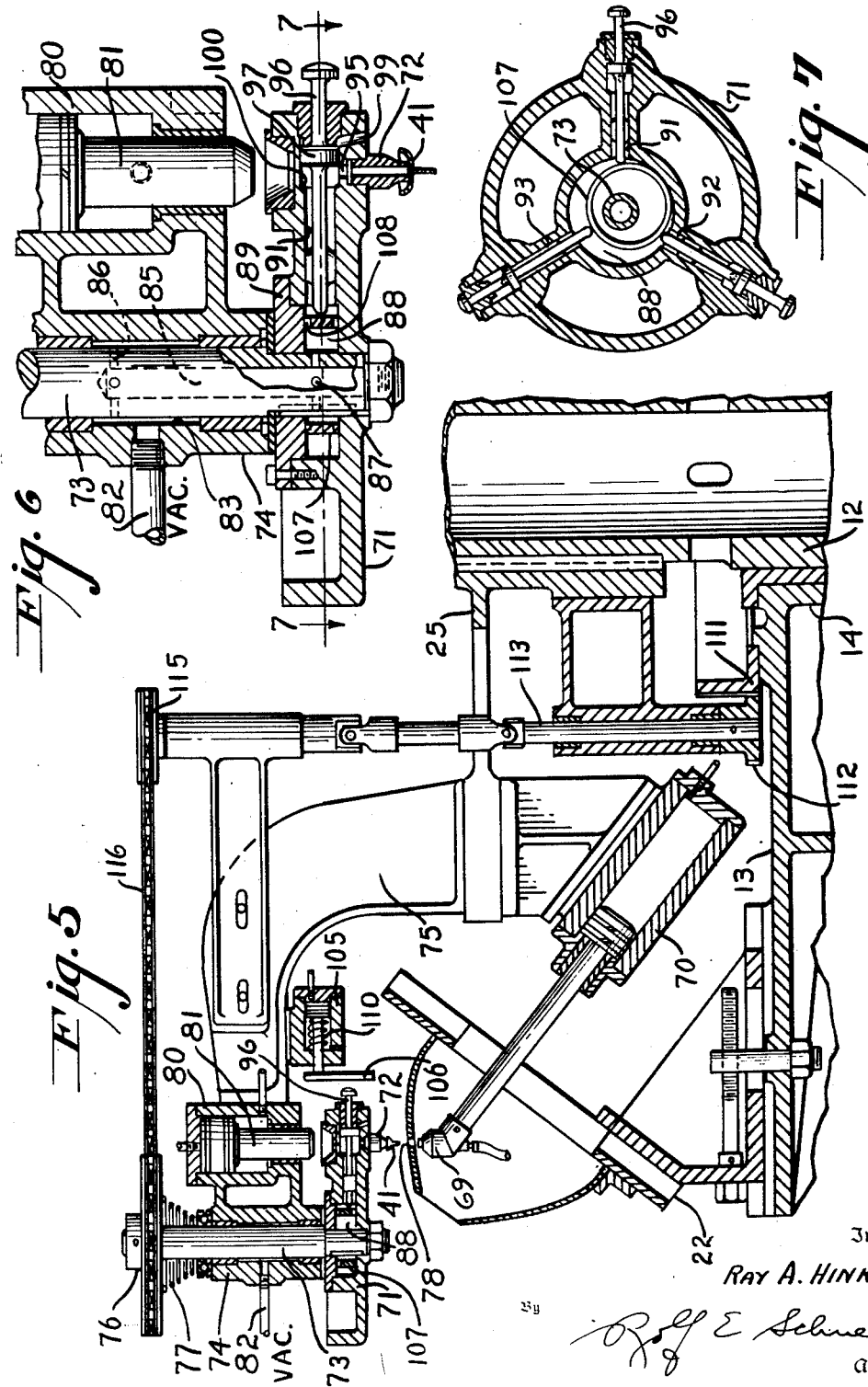
Inventor
Ray A. Hinkley
By
Rolf E. Schneider
Attorney

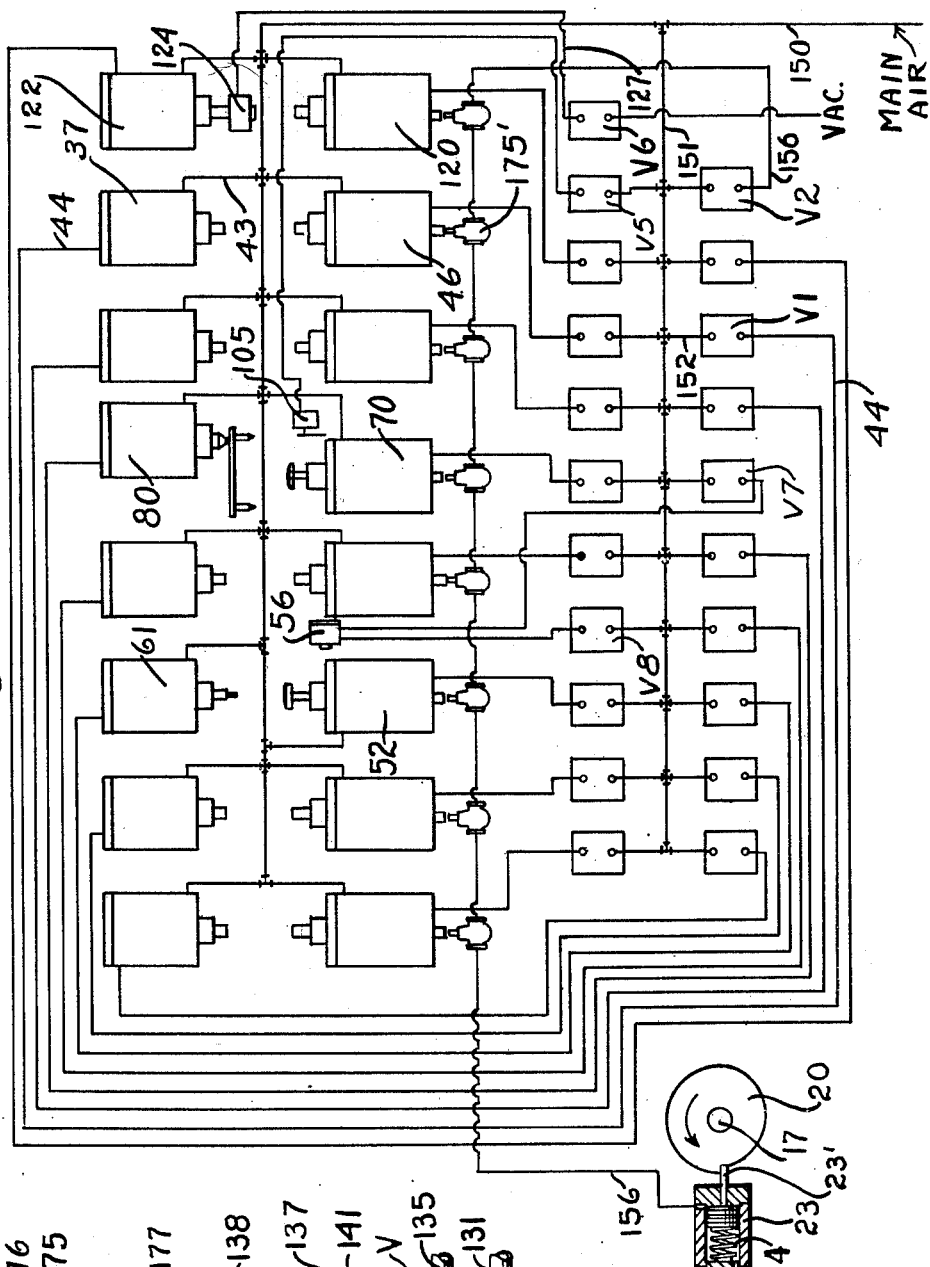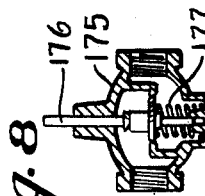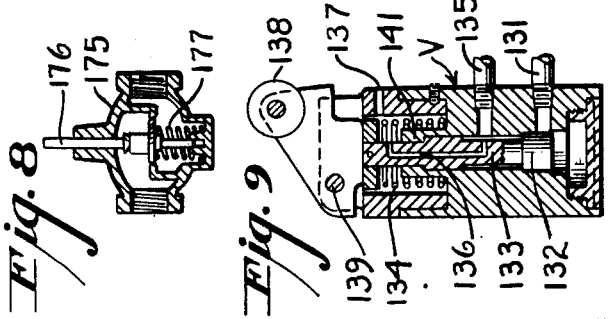

Patented May 12, 1953

2,637,942

UNITED STATES PATENT OFFICE 2,637,942

GLASSWORKING MACHINE

Ray A. Hinkley, Corning, N. Y., assignor to Corning Glass Works, Corning, N. Y., a corporation of New York Application January 25, 1950, Serial No. 140,509

8 Claims. (Cl. 49—1)

The present invention relates to an apparatus for perforating a glass article wall and for closing the resulting perforation with an element through which an electric current may be passed between opposite sides of the article wall.

The invention is of particular utility in the manufacture of glass cathode-ray tubes of the type now in general use in the television industry. Such a tube is customarily provided with a conductive coating on its inner surface connected with a circuit outside the tube via an electrically conductive element, hereinafter referred to as a "button," sealed into the tube sidewall.

Several ways have been developed for sealing such a button into the tube sidewall by perforating the tube wall and then closing the perforation by sealing the peripheral portion of the button to the glass bordering the perforation. So far as applicant is aware, however, all methods heretofore employed have been comparatively slow and expensive, being manually performed and requiring a skilled operator.

The principal object of the present invention is to provide an apparatus by means of which the perforation of the sidewall of the tube and the sealing of the button in such perforation are accomplished entirely automatically at a rapid rate compared to prior practice, and without the need of a skilled attendant.

In accordance with the present invention, an indexed table is provided with a circular row of tube chucks which are successively indexed through tube-loading, tube-heating, tube-perforating, button-inserting, tube-reheating, button-aligning, and tube-unloading positions. A preferred embodiment of the invention includes ten such positions, in position 1 of which a tube is placed in the tube chuck. In positions 2 and 3 intense, highly localized, heating flames are directed to opposite wall surfaces of the tube in the area at which the perforation is to be made. In position 4 a conventional form of punch and die functions to make the desired perforation through the heated and softened glass. In position 5 further heating of the glass surrounding the perforation is done. In position 6 a button is deposited in the perforation. In positions 7 and 8, heat is directed into the button and the adjoining glass to effect a hermetic union between the glass and the button.

In effecting such intimate union between the button and the glass, it sometimes occurs that the glass softens to such an extent that the button and the glass immediately surrounding it slightly sag. In position 9, provision is accordingly made to seize and lift this glass and the button into their original position with respect to the tube wall proper. Also in this position an annealing flame is directed toward the inner wall surface of the tube occupied by the button. In position 10 the tube is removed from the chuck.

A preferred form of apparatus embodying the invention is illustrated in the accompanying drawings, in which:

Fig. 1 is a diagrammatic view in plan of such apparatus.

Fig. 2 is a diagrammatic view showing the manner of indexing the table and the cam drive arrangement employed in initiating the indexing operation, in controlling the actuation of equipment at the respective indexed positions at which the tube is treated, and in controlling the connection and disconnection of a source of vacuum to a chuck at position 9 employed to effect lifting of the button and the surrounding softened glass.

Fig. 5 is an enlarged elevational view, partly in section, of a fragment of the equipment at the button-inserting position.

Fig. 6 is a sectional elevation on an enlarged scale, of a portion of the button-inserting equipment shown in Fig. 5.

Fig. 7 is a sectional plan view on a reduced scale, taken generally on line 7—7 of Fig. 6.

Fig. 8 is a view in sectional elevation, of a form of safety valve employed.

Fig. 9 is a similar view of one of a number of such valves actuated by the cams of Fig. 2.

Fig. 10 is a diagram, with certain elements shown in section, of the piping for the apparatus of Fig. 1.

Figure 2:
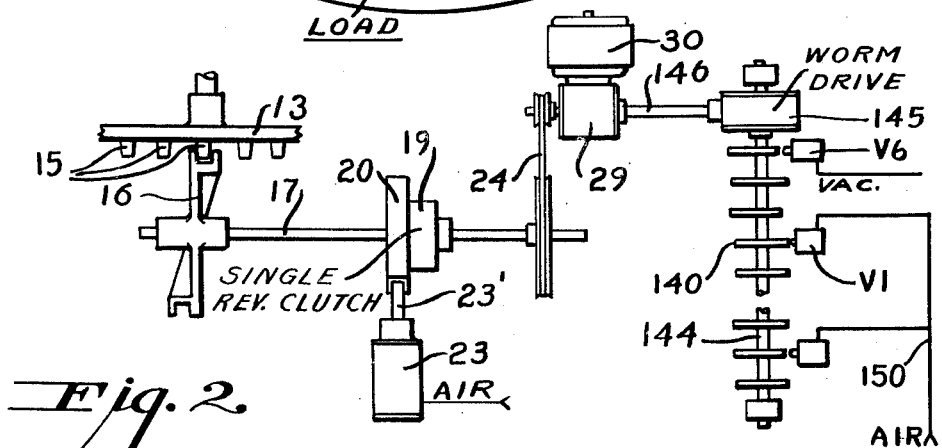
Figure 3:
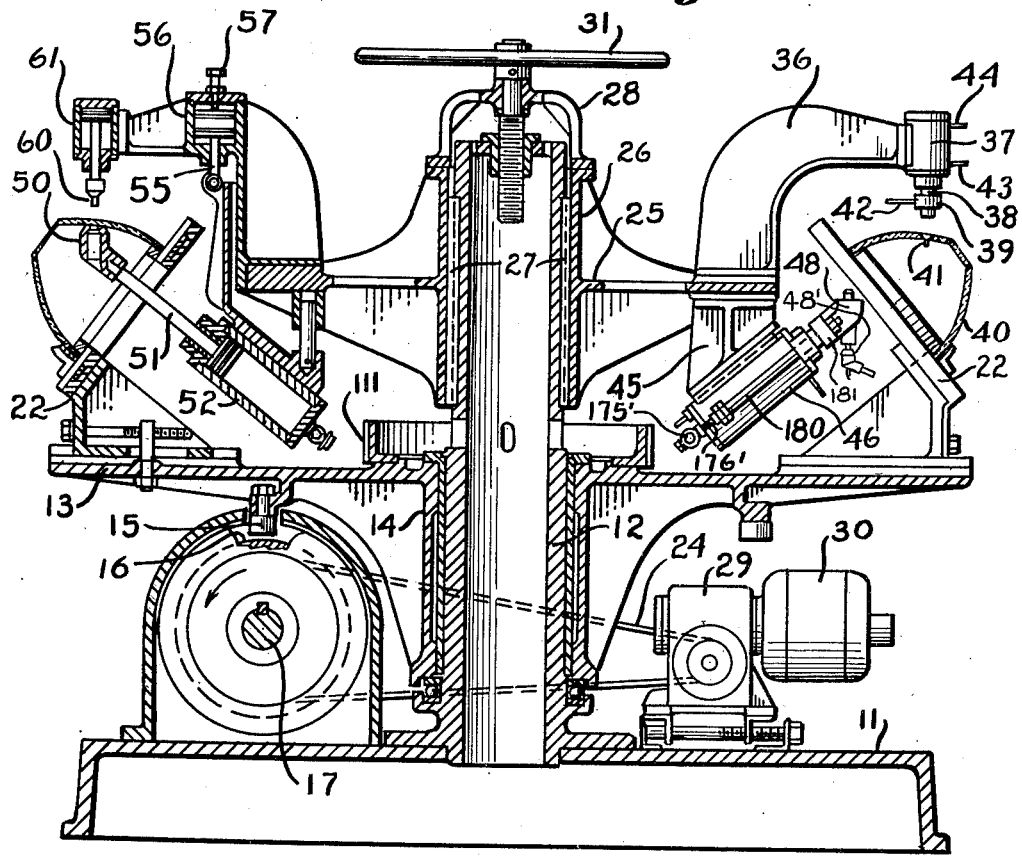
Fig. 3 is a sectional elevation taken generally on line 3—3 of Fig. 1.

Referring to the drawings in detail, and particularly to Fig. 3, 11 represents a base provided with a fixed vertical column 12. A table 13 has a hub 14 rotatable about column 12, and has depending rollers 15 by means of which the table is indexed by a cooperative indexing wheel 16 in a conventional fashion each time a shaft 17 supporting such wheel is rotated a single revolution. The precise method of indexing is best illustrated in Fig. 2, which illustrates wheel 16 as adapted to be periodically driven by means of a single revolution clutch 19 each time an associated pneumatic unit 23 is operated to release the clutch-driven ratchet disc cam 20. Rotation of the clutch 19 is effected by means of a belt 24 through a gear reduction unit 29 continuously driven by a motor 30.

Figure 1:
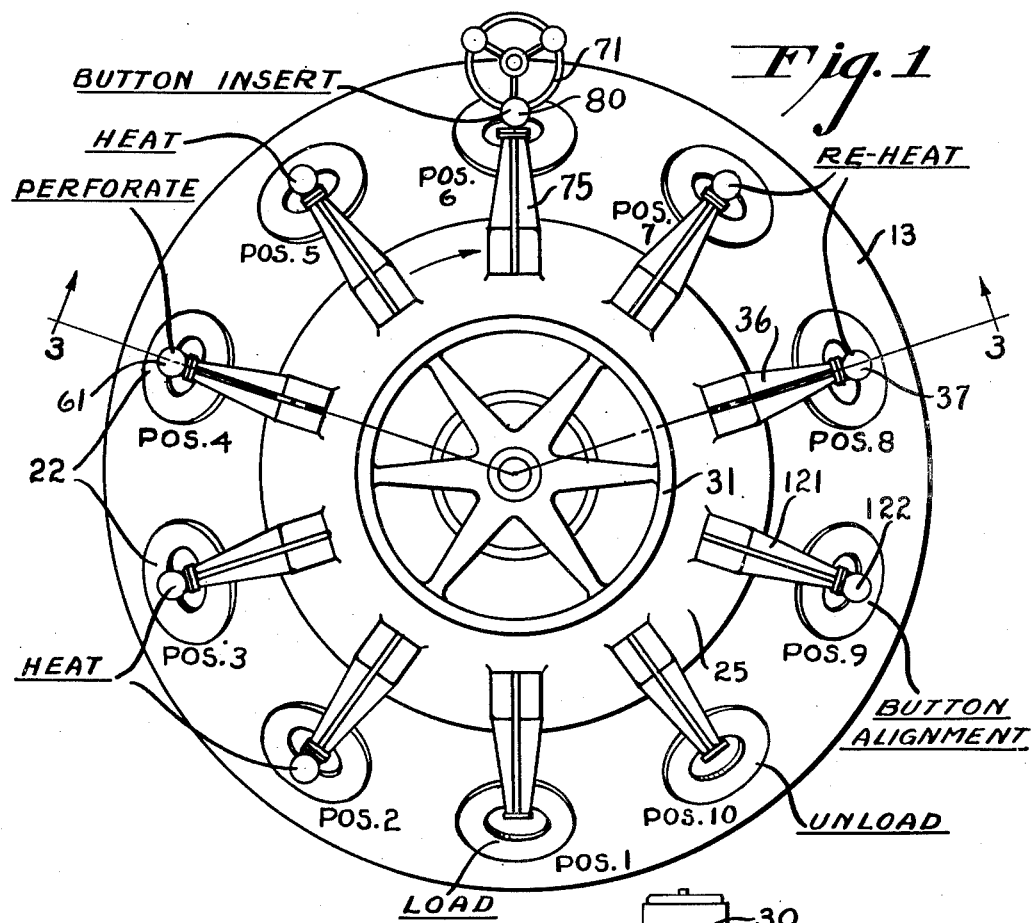

Arranged on table 13 are ten circular tube chucks 22 adapted to be successively indexed through positions 1 to 10 as designated in Fig. 1. Each of positions 2 to 9 is provided with equipment carried by an arm or bracket of a spider 25 having a hub 26 surrounding column 12 and locked against relative rotary movement by keys 27. The hub 26 is suspended from a bell 28 which may be vertically moved by means of a hand wheel 31 to adjust the height of spider 25 to that most suitable for the size of ware carried by the chucks 22.

The heating equipment at positions 2, 3, 5, 7, and 8 is identical except for possible variation in burner detail, and therefore a description of the equipment at position 8 (shown in the right-hand portion of Fig. 3) will suffice. A bracket 36 extends upward and outward from spider 25, and at its free end carries a differential pressure pneumatic unit 37 having a projecting piston rod 38 equipped with a burner 39 supplied with a combustion mixture by a flexible tube 42 and adapted to direct flames toward the wall area of a tube 40 occupied by a button 41 being sealed thereinto. The lower end of unit 37 is continuously supplied with air via a flexible tube 43 to maintain burner 39 in a retracted position except at such times that air is being supplied to the upper end of the unit via a flexible tube 44, as more fully explained hereinafter.

Carried on the underside of spider 25 by a bracket 45 is a second pneumatic unit 46, having on the free end of its piston rod (not shown) a burner 48 having a fuel line 48'. As with the case of unit 37, the piston rod of unit 46 is normally held in its retracted position by fluid continuously supplied to its burner end. Unit 46 is adapted to advance burner 48 through a chuck 22 into close proximity of the inner wall surface of a tube 40 opposite the surface towards which burner 39 is directed only at such times that a chuck is indexed thereover. A pneumatic unit 70 (Fig. 5) similar to unit 46 and provided with a burner 69 similar to burner 48, is also provided at the button-inserting position 6. A similar unit 120 (Fig. 10) at the button-aligning position 9 is also provided with a burner (not shown) for directing heat into the tube area occupied by the button.

The perforating equipment at position 4 (Fig. 3) comprises a die 50 carried on the free end of piston rod 51 of a differential pneumatic unit 52 similar to units 37 and 46 and operated in like fashion. Unit 52, however, instead of being mounted in fixed relation to spider 25, is suspended from the piston rod 55 of a pneumatic unit 56. The unit 52 is adapted to advance the die 50 into vertical alignment with the punch 60 of a pneumatic unit 61, but stops the die short of the height necessary to bring it into engagement with the tube. Unit 56 is subsequently operated to raise unit 52 the necessary distance to bring die 50 into engagement with the associated tube. An adjusting cap screw 57 enables precise adjustment of this latter operation.

Referring now particularly to Figs. 5 and 6, the button-inserting equipment at position 6 includes a turret 71 having three button-holding vacuum chucks, one such chuck 72 being shown. Turret 71 is carried on the bottom end of a shaft 73 passing through a hub 74 integral with a pneumatic unit 80 supported on a bracket 75 extending from spider 25. The upper end of shaft 73 projects a substantial distance above hub 74 and is provided with a sprocket wheel 76. A spring 77 interposed between hub 74 and wheel 76 normally holds the turret 71 in engagement with the bottom of hub 74. Pneumatic unit 80 has a piston rod 81 aligned over the turret 71 and adapted to lower it against the tension of spring 77 a distance required to place a button 41 over the tube perforation 78.

Referring particularly to Fig. 6, it will be observed that a pipe 82, connected to any suitable vacuum source (not shown), communicates with a chamber 83 surrounding shaft 73. Shaft 73 has a tubular bore 85 with passages 86 connecting bore 85 with chamber 83. Near its bottom end, shaft 73 has passages 87 between bore 85 and a chamber 88 formed in the upper surface of turret 71 and closed at the top by a flanged cover 89. Chamber 88 has three passages 91–93 (Fig. 7) extending therefrom to the respective button chucks, such as chuck 72. Since these latter passages and the valves therein are alike, a description of passage 91 and the valve therein will suffice.

Passage 91 is in communication with chuck 72 via a passage 95. A valve stem 96 occupying passage 91 has an enlarged member 97 adapted in the position shown in Fig. 6 to close a passage 99 to atmosphere, and to in an alternative position engage a seat 100 to close the path between passages 91 and 95 while connecting passage 95 to atmosphere via passage 99. With valve stem 96 in the position shown, button 41 is held in the chuck 72 by vacuum. Movement of stem 96 to its "in" position to release the button is arranged to occur after turret 71 has lowered the button 41 over the tube perforation 78.

This is accomplished by a pneumatic unit 105 (Figs. 5 and 10) having a member 106 pneumatically operable into direct engagement with stem 96, and adapted to be restored by a spring 110. Stem 96 in its movement to its "in" position causes a cylindrical ring 107 (Figs. 5–7) within chamber 88 to shift its position therein sufficiently to move the stems of the valves occupying passages 92 and 93 to their "out" positions so that the chucks associated with them are conditioned to hold buttons when the latter are placed thereon. The buttons may be manually brought into engagement with such chucks, or conventional equipment may be used to load them, as desired. Ring 107 is provided with a number of passages 108 (Fig. 6) to prevent its interference with the communication of vacuum between chamber 88 and passages 91–93.

Indexing of the turret 71 is effected by a driving connection comprising a ring gear 111 on table 13 in mesh with a pinion 112 carried on the bottom end of a shaft 113 adapted to drive a sprocket wheel 115 provided with a drive chain 116 also extending about the button turret sprocket wheel 76. The sizes of wheels 76 and 115, and of the pinion 112 and gear 111, are such that turret 71 makes one-third revolution each time table 13 is indexed, and thus successively positions the respective turret-carried chucks, such as chuck 72, over the perforations in tubes successively registered at the button-inserting position.

Figure 4:
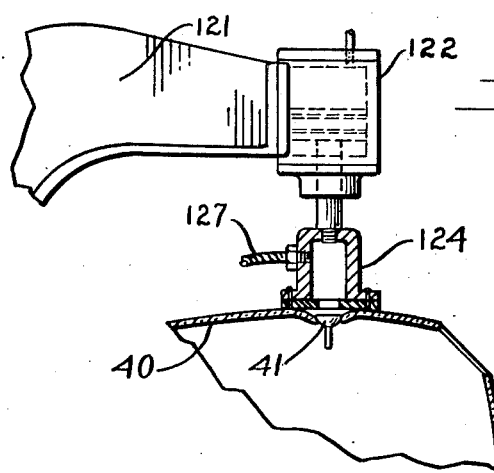
Fig. 4 is an enlarged, side-elevational view, partly in section, of the equipment located at position 9 and showing, in section, a fragment of a tube having a button sealed therein.

The button-aligning equipment at position 9 includes a bracket 121 (Figs. 1 and 4), extending from spider 25 and provided with a differential-pressure pneumatic unit 122 similar to the unit 37, but equipped with a vacuum chuck 124 adapted to be lowered by the unit over a sealed-in button, such as button 41, aligned thereunder whenever fluid is supplied to the upper end of the unit. Vacuum chuck 124 is activated at the proper time to lift the button and the surrounding softened glass to their original position with respect to the unsoftened glass of the tube wall, as will be more fully described hereinafter.

*Timing*

Timing of the connection of vacuum to chuck 124, the operations of pneumatic units 23, 37, 46, 52, 56, 61, 70, 80, 105, 120, and 122, and the operations of the similar units at positions 2, 3, 5, and 7, are effected by means of like cam-actuated valves such, for example, as the valve V shown in Fig. 9. Valve V in its normal position blocks air supplied to its intake pipe 131 from passage therethrough by means of a member 132 of a slide 133 normally held in the position shown by a spring 134. On the other hand, at this position a pipe 135 for connection with an end of a pneumatic unit, such as unit 37, for example, is connected to atmosphere via a passage 136 through slide 133 and a passage 137 of the valve housing. Slide 133 is moved downward, having reference to Fig. 9, when a cam, such as, for example, cam 140 (Fig. 2) depresses a roller 138 carried by a slide actuator pivoted at 139. With slide 133 in the latter position, a portion 141 of the valve housing blocks passage 136, while member 132 opens a passage in the valve between pipes 131 and 135, thus admitting operating air to the end of the unit to which pipe 135 is connected.

Referring momentarily to Fig. 2, it will be noted that cam 140 and the other similar cams for controlling the operation of the respective pneumatic units of the entire apparatus are carried by a shaft 144 adapted to be continuously driven by motor 30 through a worm drive assembly 145 and a drive shaft 146 extending therefrom to the speed-reducing unit 29.

Referring now to Fig. 10, it will be observed that the forward end of each of the described pneumatic units 37, 46, 52, 61, 70, 80, 120 and 122, and the corresponding ends of all of the similar units, are normally supplied with air from supply line 150, whereby the pistons are normally maintained retracted within the units. Owing to greater exposed piston surface area available to air supplied to the rear ends of these units, they will advance their pistons whenever air is supplied to their rear ends, even though air continues to be supplied to their forward ends. Air is selectively supplied to the rear ends of the above-referred to units from supply line 150 via branch 151 and laterals thereof through valves individual to the units similar to valve V. For example, unit 37 is supplied with air over a path including branch 151, lateral 152, valve V1, and conduit 44 at such time that the cam 140 (Fig. 2), associated with valve V1, operates it.

Fluid is supplied to the forward end of the table-indexing pneumatic unit 23 under control of a cam actuated valve V2 to cause rod 23' to release disc cam 20 of the single revolution clutch 19 (Fig. 2). Return of rod 23' is by means of a spring 154 when the supply of fluid to unit 23 is discontinued.

In a similar fashion fluid is supplied to the rear end of the button-release pneumatic unit 105 under control of a cam actuated valve V5 to cause element 106 (Fig. 5) to move outward against the tension of its spring 110 to move the valve stem 96 to its inward position.

Operation of unit 56 in one direction is by fluid supplied through the cam actuated valve V7 (Fig. 10) and in the other direction by fluid supplied through a similar valve V8.

*Safety feature*

As will be appreciated, since the piston rods of the lower pneumatic units 46, 52, 70, and 120, and the rods of other similar units not specifically referred to, in their forward position are in the path of travel of chucks 22, provision is desirable to positively prevent indexing of table 13 unless the rods of all such units are in their normal retracted position. This is accomplished by including in the fluid-supply line 156, extending between cam actuated valve V2 and unit 23, a valve similar to valve 175 (Fig. 8), having an operating stem such as stem 176 normally held in closed position by a spring 177, near each pneumatic unit and associating with the unit means for opening the associated valve only when the unit has its piston rod in its fully retracted position. This is accomplished in the manner illustrated in Fig. 3 wherein a valve 175' has an operating stem 176' adapted to be depressed by an actuator rod 180 secured to a bar 181 attached to the piston rod (not shown) of unit 46. From the foregoing it will be appreciated that when cam actuated valve V2 is operated to supply operating fluid to the indexing-initiating unit 23, fluid can only reach such unit if valve 175' and the similar valves in supply line 156 are at the time being held open by their associated pneumatic units.

*Operation*

Assuming motor 30 is running and that lower pneumatic unit 46 and the similar units are in their normal positions, and that a tube such as 40 is placed on a chuck 22 at the loading position, the table-indexing operation will be initiated under control of cam actuated valve V2 and pneumatic unit 23, and the chuck indexed to position 2. While the tube remains in position 2, the pneumatic units thereat corresponding to units 37 and 46 will move their burners to their alternative position to apply heat to the opposite surface areas of the portion of tube 40 to be perforated. Likewise, the units at the respective remaining positions 3 through 9 will also function at this time to perform their intended operations on other tubes, assuming, of course, that the chucks associated therewith are occupied.

In position 3 the necessary heating of the tube prior to perforating is completed. In position 4 units 52 and 56 operate to properly position die 59, after which unit 61 operates to lower punch 60 to effect perforation of the tube wall. In position 5 heat is applied to the glass bordering the perforation to aid in bringing the temperature of the glass to that suitable for effecting a union between it and a button.

In position 6 unit 70 is operated to bring the burner 69 carried by its operating rod into efficient heat-applying relation to the glass surrounding the perforation, and unit 80 is operated to lower turret 71 to position the button carried by chuck 72 immediately over the tube perforation. A moment later unit 105 is operated to shift valve stem 96 to its inward position to effect release of the button from chuck 72. Obviously, restoration of units 80 and 105 is effected immediately after they have performed their functions. Restoration of unit 70 may, if desired, be delayed until just prior to the subsequent indexing of table 13.

In the subsequent positions 7 and 8, as will be understood, the necessary heat is applied to weld the button to the border of the perforation.

In position 9, while the burner of unit 120 is being utilized to apply annealing flames to the inserted button and the surrounding glass, unit 122 lowers chuck 124 over the button and the surrounding softened glass. Under control of cam actuated valve V6 the associated vacuum supply line is momentarily connected via such valve and conduit 127 with chuck 124, which thereby lifts the button and the surrounding workable glass to the desired position with respect to the tube wall. A moment later cam actuated valve V6 cuts off the vacuum supply from chuck 124 and exhausts the chuck to atmosphere. Subsequently, unit 122 raises chuck 124 to its initial position clear of the path of movement of the tube during the subsequent indexing of table 13. The operations occurring in position 9 are more fully described and claimed in the copending application of Francis R. Painter, Serial No. 148,608, filed March 9, 1950.

In position 10 the tube maybe removed from its chuck.

Although the invention is shown embodied in an apparatus adapted to seal a conductive element in a cathode-ray tube wall, it obviously would be equally applicable to an apparatus for the sealing-in of other forms of elements in articles supported on suitable chucks of a similar rotatable table.

What is claimed is:

1. In a glass-working machine, means for initially locally heating a wall area of a glass article, a punch and die assembly, means for associating said assembly with opposite sides of the locally heated wall area, means for operating said assembly to perforate the article wall thereat, means for freely depositing an electrically conductive element in the resulting perforation and on the glass bordering the same, said means including a vacuum chuck for holding said element in initial register over said perforation and means for thereafter disabling said chuck to release said element for deposit in said perforation, and means for heating the element and for further heating the surrounding glass on which it rests to seal them to one another.

2. In a glassworking machine a rotatable table, an article chuck arranged near the periphery of said table, means for rotating said table in step-by-step fashion to successively index said chuck at a plurality of stations, means positioned at one of such stations to initially locally heat a predetermined area of a wall of a glass article occupying said chuck to a plastic condition, means positioned at a second station for removing a portion of the heated wall to form a perforation therethrough, said means including a punch and die assembly, means for associating said assembly with the opposite sides of such locally heated wall area, and means for operating said assembly to perforate the article wall thereat, means positioned at a third station for freely depositing an electrically conductive element or the like in the perforation and on the glass bordering the same, said means including a vacuum chuck for holding said element in initial register over said perforation and means for thereafter disabling said vacuuum chuck to release said element for deposit in said perforation, and means positioned at a fourth station to apply heat to the element and to further heat the adjoining glass to fuse them to one another.

3. In a glass-working machine a rotatable table, a chuck arranged on such table and adapted to hold a hollow glass article, means for indexing said table to successively position such chuck at a plurality of working stations, heating means arranged at a first of said stations, means to position said heating means into heat input relation with respect to a restricted wall area of an article held in said chuck following the arrival of the chuck at such station and for restoring said heating means to its initial position prior to the indexing of said chuck to a second station, perforating means arranged at such second station, means for operating said perforating means following the arrival of the chuck at such second station to perforate the article in such restricted wall area, a holder arranged at a third station for suspending an electrically conductive element or the like, means for disabling said holder following the arrival of the chuck at said third station to release the element onto the wall immediately surrounding the perforation in the restricted wall area of such article, means operable following the arrival of the chuck at said third station to actuate said disabling means, heating means arranged at a fourth station, and means to temporarily position the latter heating means into heat input relation with respect to the restricted wall area of the article following the arrival of the chuck at such fourth station in order to effect a seal between the article and the element.

4. A glass working machine such as defined by claim 3 wherein the holder comprises a vacuum chuck and a vacuum line thereto and the disabling means includes a valve associated with the vacuum chuck and operable to close the vacuum line to the vacuum chuck and to bleed such chuck to atmosphere.

5. A glass working machine such as defined by claim 3 which includes means at such third position for lowering the holder to bring the electrically conductive element into close proximity to the article preceding its release from the holder.

6. A glass working machine such as defined by claim 3 in which said holder comprises one of a plurality thereof and which includes a turret supporting said holders, and a driving connection between said table and said turret of such ratio that said turret successively indexes a different holder at such third station each time said table is indexed.

7. In a machine for sealing an electrically conductive element or the like to that wall portion of a hollow glass article surrounding a perforation therein, a rotatable table, a chuck arranged on such table and adapted to hold such a hollow glass article, means for indexing said table to successively position such chuck at a plurality of working stations, a holder permanently positioned at one of said stations for suspending an electrically conductive element, means for disabling said holder following the arrival of the chuck at such station to release the element onto the wall immediately surrounding the perforation in such article, means operable following the arrival of the chuck at such station to actuate said disabling means, heating means positioned at a subsequent station and means to temporarily position said heating means into heat input relation with respect to said element and the adjoining glass to heat the element and the article wall immediately surrounding it following the arrival of the chuck at such station in order to effect a seal between the article and the element.

8. In a machine for sealing an electrically conductive element or the like to that wall portion of a hollow glass article surrounding a perforation therein, a rotatable table, a chuck arranged on such table and adapted to hold such a hollow glass article, means for indexing said table to successively position such chuck at a plurality of working stations, a holder permanently positioned at one of said stations for suspending an electrically conductive element, means for disabling said holder following the arrival of the chuck at such station to release the element onto the wall immediately surrounding the perforation in such article, means operable following the arrival of the chuck at such station to actuate said disabling means, means for heating the element and the article wall at a subsequent station and means to temporarily position said heating means into heat input relation with respect to said element and the adjoining glass to heat the element and the article wall immediately surrounding it in order to effect a seal between the article and the element.

RAY A. HINKLEY.

References Cited in the file of this patent

UNITED STATES PATENTS

| Number | Name | Date |
| --- | --- | --- |
| 2,011,980 | Miller | Aug. 20, 1935 |
| 2,192,302 | Errett | Mar. 5, 1940 |
| 2,209,252 | Stewart et al. | July 23, 1940 |
| 2,314,826 | Hinkley | Mar. 23, 1943 |
| 2,339,850 | Goodale | Jan. 25, 1944 |
| 2,410,345 | Hinkley | Oct. 29, 1946 |
| 2,427,712 | Casler et al. | Sept. 23, 1947 |
| 2,492,162 | Litton | Dec. 27, 1949 |
| 2,553,135 | Eisler | May 15, 1951 |